Patented Oct. 1, 1940

2,216,500

UNITED STATES PATENT OFFICE 2,216,500

METHOD OF MAKING HEATED HORTICULTURAL BEDS WITH HEAT-PRODUCING FERTILIZER

Kai Petersen, Buddinge Vaerk, Soborg, near Copenhagen, Denmark

No Drawing. Application February 4, 1938, Serial No. 188,784. In Denmark February 20, 1937

2 Claims. (Cl. 71—14)

This invention relates to a heat-producing material for heated horticultural beds, or a so-called hotbed fertilizer, and a method of making such material.

As is well known, the cultivation of plants in heated beds is effected by placing a heat producing material beneath the soil in which the plants grow, and as an example of such materials ordinary stable-dung has been used.

The main object of such a material is to effect a heating of the bed in which the plants are cultivated. The heat is produced by the biological decomposition of the material, said decomposition being effected by thermophile microorganisms, thereby providing the most favorable climatic conditions to the microorganisms in the soil in which the plants grow. In the biological decomposition process, carbon-dioxide and other gaseous decomposition products are formed which ooze upwardly from the substratum through the pores of the layer of mould. These gaseous decomposition products exert a favourable influence upon the growth of the plants and constitute in part a gaseous fertilizer for the plants. Therefore, besides producing underground heat in the bed the heat-producing material also to some extent acts as fertilizer for the plants.

During the constantly increasing demands for fresh vegetables for a longer period than the natural seasons of the vegetables and even throughout the year, the cultivation of plants in heated beds, both in hotbeds and in hothouses, has been more and more commonly used. A contributory cause has been the acknowledgment that fresh vegetables are greatly preferred to the canned variety, since as a matter of fact the vegetables lose taste as well as valuable nutritive substances in canning.

As above mentioned stable-dung (horse-manure) has previously been used as a hotbed fertilizer. As the amounts of stable-dung have decreased, since horse-driven traffic has to a large extent given way to motor traffic, it has been more and more difficult to procure stable-dung and at the same time the price of this manure has risen so much that the employment thereof as hotbed fertilizer has hardly been profitable.

Other means have therefore been suggested to provide the necessary heat in the heated beds. For example, it has been suggested to heat the beds electrically or by the combustion of fuels in connection with hot-water conduits, steam conduits or air ducts. Such installations however are expensive, and the running costs high. In addition, the plants grown in this manner do not yield crops equal to those obtained by the employment of stable-dung whilst the quality of the vegetables is not so good. The reason for this may be attributed to the fact that the stable-dung previously used gives off carbon-dioxide and the like during the thermophile fermentation which is of importance to the plants and is lacking in artificial forms of heating. This might be remedied by installing devices giving off carbon-dioxide, but this would, amongst other things, be too expensive.

In view of the foregoing drawbacks which are both of an economic and a technical nature attempts have been made to find another heat-producing material to take the place of stable-dung. Such a material has been found in "fresh" household and towns' refuse, which has been employed in the condition in which it occurs when being carried to the refuse dumps. The employment of untreated household and towns' refuse has increased to some extent in spite of the fact that its use gives rise to a number of difficulties and is moreover unpleasant. Household and towns' refuse is very difficult and unpleasant to handle in the condition in which the gardeners receive it. The refuse causes a disagreeable scattering by the wind of ashes and paper over the gardens during its dumping, its temporary storing, the necessary digging over of the storage heaps and the final transmission of the same to the hotbeds in question, whilst the employment of untreated refuse is annoying to neighbours, due partly to the aforesaid scattering of ashes and paper, and partly to the stench caused by decomposition processes which proceed in the refuse consequent to various local conditions of life in the storage heap. Moreover, rats and the like are attracted by the untreated refuse.

In addition to these obviously hygienic drawbacks untreated refuse is of a condition so heterogeneous that it is but little suited for use as a hotbed fertilizer. In consequence of the heterogeneous nature of the material the thermophile fermentation will not be uniform and evenly distributed. At some places plenty of fermentable material will be present while at other places material of this nature is insufficient or absent. Thus, an unequal and partly local heat fermentation arises causing an unequal distribution of the heat in the hotbed. Moreover, the development of gaseous decomposition products, particularly of carbon-dioxide will be more vigorous at some places than at others.

As is known, the heat fermentation referred to also requires a suitable amount of moisture. In the untreated household and towns' refuse the moisture is not uniformly distributed. For this reason, sufficient material to create a heat fermentation, but insufficient amounts of moisture will be present at some places, while the contrary will be the case at other places.

In compacting a material of a nature so heterogeneous as untreated household and towns' refuse, which compacting is necessary to an excellent fermentation, an unequal compactness of the material will necessarily be obtained. Consequently, objectionable air pockets are formed and a varying concentration of oxygen will result together with the risk of an excessively large loss of heat due to irradiation.

Finally, the removal after use of the untreated refuse is disagreeable and costly partly owing to larger unconverted organic parts and partly and more particularly owing to the inorganic parts.

The object of the present invention is the use of household and towns' refuse as a hotbed fertilizer, but to avoid all the drawbacks present when using this material in the untreated condition. This is obtained by the employment of household and towns' refuse which is brought into an egalised condition, i. e. a sample taken from the treated refuse will correspond substantially to an average sample of such material in respect of the distribution of the various components as well as in respect of the degree of moisture.

To this end, the invention comprises a heat-producing material for heated horticultural beds (hotbed fertilizer), in which said material contains or consists of household and towns' refuse, which has been brought into an egalised condition by the employment of suitable mechanical means.

The employment of such a material excludes the possibility of ashes and paper becoming scattered by the wind and for the most part, the annoying stench accompanying the heaping of untreated household and towns' refuse, is avoided. When the refuse is egalised, i. e. converted into a substantially homogeneous mass, the microbian decomposition will progress in such a manner that no disagreeable odour is given off.

When using stable-dung as well as untreated household and towns' refuse it is necessary before placing the materials in the hotbeds to heat them in order to initiate the heat fermentation. This is unnecessary when using the material of the invention, which may be placed in the hotbeds immediately after egalisation, a saving in work, space and an increased hygiene are thereby obtained.

As the treated household and towns' refuse of the present invention presents a substantially homogeneous mass, the different culture media for the thermophile microorganisms are uniformly distributed in the mass and the moisture content and the distribution of air (oxygen) necessary to the growth of said organisms are uniform so that a thermophile fermentation of uniform strength will proceed throughout the material.

Finally, after use the heat-producing material according to the invention forms an excellent top dressing.

The production of the material according to the invention may be carried out in various ways adapted to convert a heterogeneous material into a substantially homogeneous mass by employment of suitable mechanical devices.

According to the present invention the household and towns' refuse is subjected to egalisation if desired after preceding separation of larger inorganic components, by a more or less extensive mechanical subdivision during simultaneous or with subsequent intermixing or kneading. In carrying out the method of the invention any mechanical device may be used in which a homogenisation with preceding or simultaneous mechanical subdivision is effected. Suitable devices are for example ball mills and allied mills, other grinding and disintegrating aggregates, mixing drums and other rotary mixing devices, if desired in connection with rolling or attrition mills or the like.

The cultivation in hotbeds is more particularly used in the winter or spring. Therefore, particularly towards the end of the year it will be difficult to procure the necessary amounts of fresh household and towns' refuse, i. e. not yet fermented refuse. It would therefore be preferable to store a portion of the household and towns' refuse accumulating during the summer for use later on. However, this is not directly possible, since both the untreated refuse and the egalised refuse cannot be stored without being decomposed.

If however, the household and towns' refuse is dried during or after the egalisation a storable material is obtained, since in drying the moisture necessary to the growth of the thermophile microorganisms is removed. Drying is preferably effected as fast as possible in order to avoid heat fermentation taking place during the drying process. Such a dried material will retain its heat-producing power during storage, for instance in silos, sacks or the like. When the material is to be used, only the necessary amount of moisture is added in the form of water, sewage, liquid manure, sewage sludge or the like.

It may be preferable to effect a separation of useless filling substances during or after the egalisation treatment or during or after drying, thereby effecting a saving in storing and transporting costs whilst at the same time increasing the value of the material as a hotbed fertilizer. The said separation may be effected by sifting, for exmple by pneumatic separation.

The egalisation effected by the method of the invention may be carried out to a more or less extensive degree according to the nature of the refuse under treatment and to the operating costs connected with the carrying out of the method. It may happen that for economic reasons a cheaper but on the other hand less effective egalisation device is used. When it is not intended to use the homogenised household and towns' refuse at once, but the same is subjected to drying so that it may be stored, then in view of the drying process it is preferable to use a more extensive degree of egalisation and subdivision than that employed when the material is to be used at once.

The egalised household and towns' refuse according to the invention is better suited as a hotbed fertilizer than stable-dung hitherto used, since, amongst other things, the material has a greater uniformity of texture. Therefore, the hotbed fertilizer of the invention will generally consist entirely of egalised household and towns' refuse. However, the invention also includes the use of such heat-producing materials as contain other heat-producing substances in addition to the treated refuse. Thus, it may be preferable to add carbohydrates in the form of subdivided waste materials specially rich in carbohydrates.

Finally, it should be noted that the expression "household and towns' refuse" when used in the foregoing is to denote not only the waste material derived from ordinary households, street sweepings and the like but also materials as refuse from hospitals and refuse from industries such as packing-houses, canning factories and other food factories, the refuse of which has a similar composition to household and towns' refuse.

Likewise the household and towns' refuse converted into a valuable hotbed fertilizer according to the invention may be admixed with other waste materials of vegtable and animal nature, for example waste materials from horticulture, agriculture and forestry, from the wood industry, the sugar industry and the like.

Having thus fully described my invention I claim as new and desire to secure by Letters Patent:

1. A method of making heated horticultural beds which comprises placing garbage beneath the soil of said beds, which garbage has been prepared by subjecting garbage to disintegration and intermixing in such manner and until such garbage has been converted into a substantially homogeneous and porous mass thereby transferring the moisture of the relatively moist components of said garbage to the relatively dry components thereof so that said mass contains a substantially uniformly distributed moisture content sufficient for the development of a thermophile fermentation, while owing to its porosity such mass contains sufficient air for the growth of the thermophile bacteria contained in the garbage, the carbohydrate-like substances of said garbage and the components thereof serving as culture media for said bacteria being substantially uniformly distributed throughout said mass, whereby favorable conditions for obtaining a uniform heat development throughout the mass are provided.

2. A method of making heated horticultural beds which comprises placing garbage which has been converted into a dry, substantially homogeneous, loose and porous mass by mechanical subdivision, intermixing and drying, beneath the soil of the said bed and uniformly moistening the dry mass before covering the same with soil.

KAI PETERSEN.